(12) United States Patent
Namikata

(10) Patent No.: US 8,537,441 B2
(45) Date of Patent: Sep. 17, 2013

(54) PROFILE PROCESSING APPARATUS, METHOD, AND PROGRAM PRODUCT TO ADJUSTING COLOR PRINTER PROFILE BASED ON CONDITION OF COLORIMETRIC MEASUREMENT OF TEST PATCH

(75) Inventor: Takeshi Namikata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 177 days.

(21) Appl. No.: 13/115,896

(22) Filed: May 25, 2011

(65) Prior Publication Data

US 2011/0299101 A1  Dec. 8, 2011

(30) Foreign Application Priority Data

Jun. 2, 2010 (JP) ................................. 2010-127070

(51) Int. Cl.
*H04N 1/60* (2006.01)
(52) U.S. Cl.
CPC ........... *H04N 1/6019* (2013.01); *H04N 1/6033* (2013.01); *H04N 1/6044* (2013.01); *H04N 1/6058* (2013.01); *H04N 1/6097* (2013.01)
USPC .............................. 358/518; 358/523; 358/504
(58) Field of Classification Search
None
See application file for complete search history.

(56) References Cited

U.S. PATENT DOCUMENTS

| | | | |
|---|---|---|---|
| 5,877,787 A | 3/1999 | Edge | |
| 5,956,044 A * | 9/1999 | Giorgianni et al. ........... | 358/518 |
| 6,804,025 B1 * | 10/2004 | Ueda et al. .................... | 358/504 |
| 7,003,151 B2 * | 2/2006 | Shimada ....................... | 358/518 |
| 7,295,703 B2 * | 11/2007 | Bala et al. ..................... | 358/1.9 |
| 7,477,418 B2 * | 1/2009 | Tobie et al. ................... | 358/504 |
| 7,499,202 B2 * | 3/2009 | Ono .............................. | 358/518 |
| 7,869,089 B2 * | 1/2011 | Horita ........................... | 358/518 |
| 8,311,321 B2 * | 11/2012 | Horita ........................... | 358/1.9 |
| 8,373,897 B2 * | 2/2013 | Horita ........................... | 358/504 |
| 2002/0039106 A1 * | 4/2002 | Shimada ....................... | 345/604 |
| 2002/0145744 A1 | 10/2002 | Kumada | |
| 2005/0018219 A1 * | 1/2005 | Senn et al. .................... | 358/1.9 |
| 2006/0007457 A1 | 1/2006 | Namikata | |
| 2008/0291498 A1 | 11/2008 | Yano | |

FOREIGN PATENT DOCUMENTS

| | | |
|---|---|---|
| CN | 101355635 A | 1/2009 |
| JP | 2006-165864 A | 6/2006 |

* cited by examiner

*Primary Examiner* — Scott A Rogers
(74) *Attorney, Agent, or Firm* — Canon U.S.A., Inc., IP Division

(57) ABSTRACT

In profile adjustment processing, if colorimetric conditions are different from those of when the profile is created, notification is performed to enable the profile adjustment with a high accuracy. According to the present invention, there is provided a method for processing a profile including acquiring a colorimetric value by measuring a color of a patch printed by an image forming apparatus based on patch data, performing a calculation for creating a profile based on the colorimetric value, storing the profile created by the calculation in association with information about a condition of the colorimetric measurement, comparing, when the profile is adjusted, the colorimetric condition corresponding to the stored profile with a colorimetric condition used when the color of the patch is measured to adjust the profile, and notifying a user if the comparison determines that the colorimetric conditions do not coincide with each other.

7 Claims, 21 Drawing Sheets

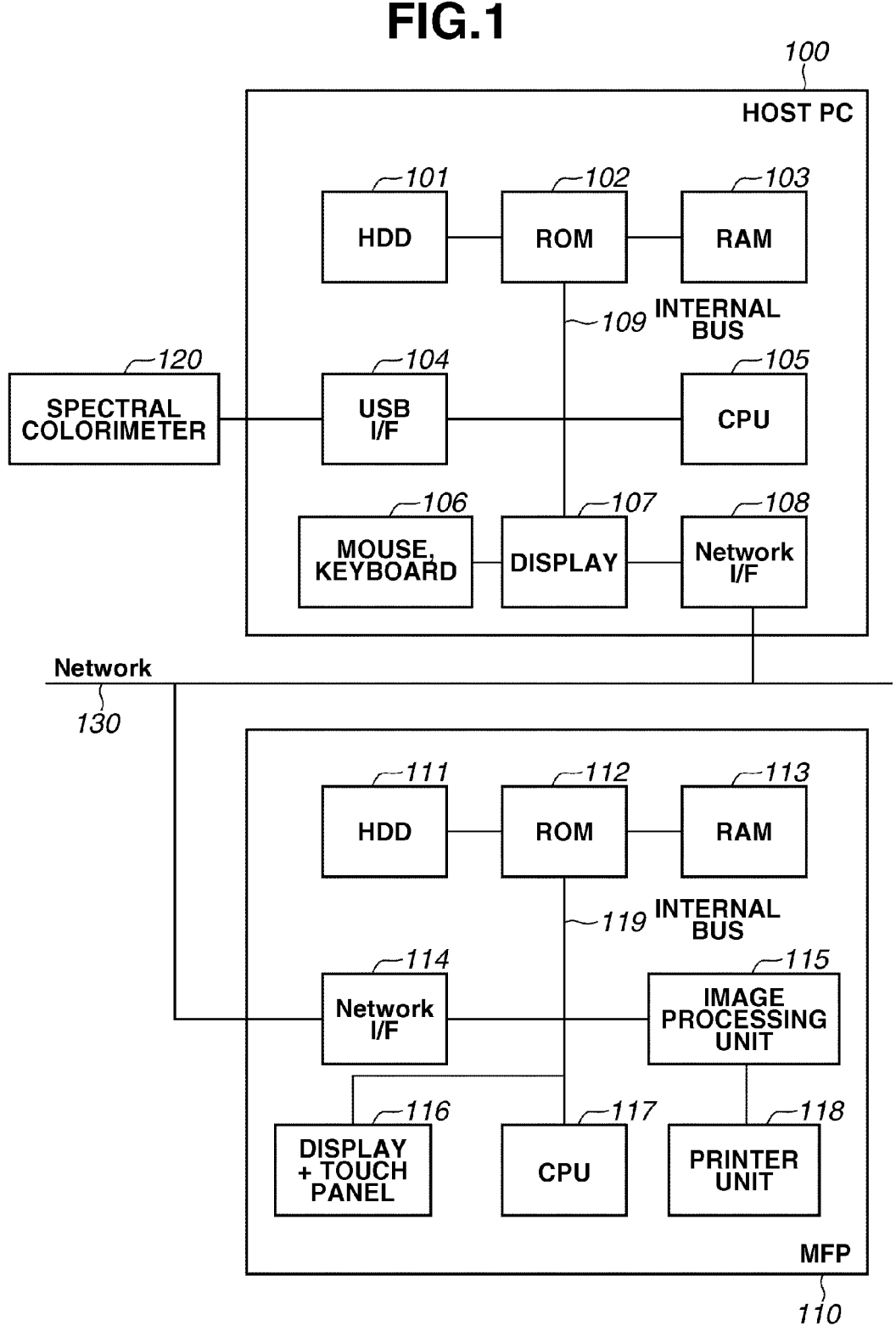

MANUAL SLIDE TYPE

MANUAL MEASURING INSTRUMENT OF ANOTHER TYPE

SHEET THROUGH TYPE

TABLE TYPE

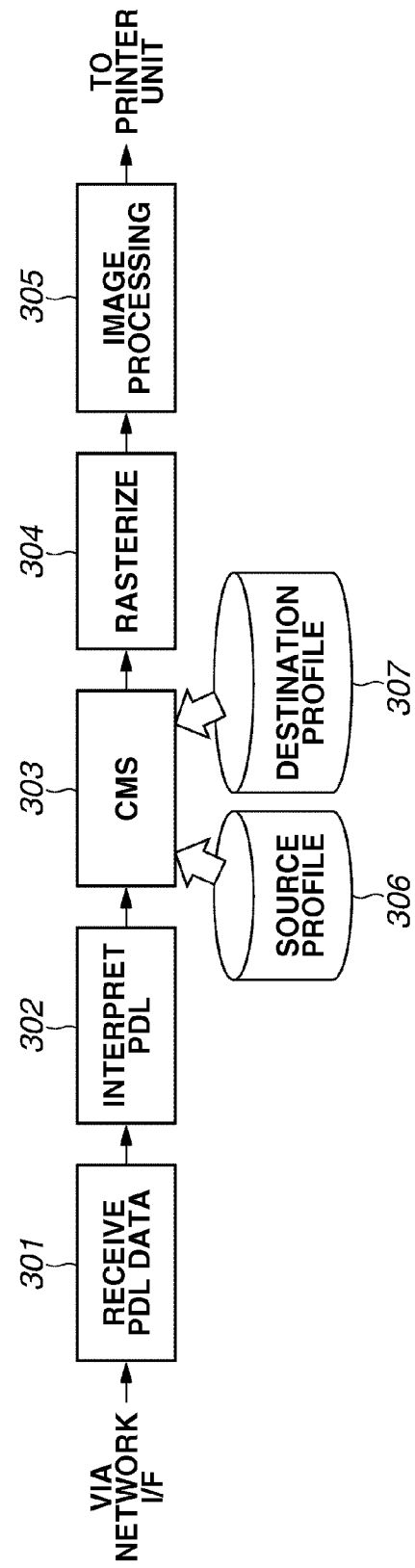

FIG.6

Build SETTING — 600

| | | |
|---|---|---|
| PROFILE FILE NAME | PrinterC1_20091130.icc | REFER — 601 |
| COLORIMETRIC DATA FILE NAME | PrinterC1_20091130.dat | REFER — 602 |
| OUTPUT DESTINATION PRINTER | Printer C1 | SELECT — 603 |

NUMBER OF PROFILE GRID POINTS (A2B)
- ● 9 × 9 × 9 × 9
- ○ 17 × 17 × 17 × 17
— 604

NUMBER OF PROFILE GRID POINTS (B2A)
- ● 17 × 17 × 17
- ○ 33 × 33 × 33
— 605

TONER/INK MAXIMUM LOADED AMOUNT  [ 240 ] % — 606

INK AMOUNT: [ AVERAGE ▼ ] — 607
- MINIMUM
- MAXIMUM
- CUSTOM...

MEASURING INSTRUMENT TYPE: [ X-Rite Eye-One ▼ ] — 608
- Gretag Macbeth SpectroLino
- X-Rite il iSis
- X-Rite il IO

609 — [ START ]  [ CANCEL ]

FILE NAME:

PrinterC1_20091130.dat

Printer: Printer C1

MEASURING INSTRUMENT: X-rite Eye-One

| No. | L | a | b |
|-----|------|----|---|
| 1 | 92 | -1 | 2 |
| 2 | **** | | |
| 3 | **** | | |
| 4 | **** | | |
| | . . . . | | |

A2B TABLE CREATION FLOW

B2A TABLE CREATION FLOW

DeviceRGB TO LAB COLORIMETRIC VALUE TABLE CREATION FLOW

FIG.16A
DIALOG 1

COLORIMETER IS DIFFERENT TYPE FROM WHEN SETTING Build.
DO YOU PERFORM MEASUREMENT?

[ YES ]　[ NO ]

FIG.16B
DIALOG 2

PAPER WHITE HAS DIFFERENT MEASUREMENT VALUE FROM WHEN SETTING Build.
IS PAPER TYPE THE SAME AS WHEN SETTING Build?

[ YES ]　[ NO ]

FIG.16C
DIALOG 3

PAPER WHITE HAS DIFFERENT MEASUREMENT VALUE FROM WHEN SETTING Build.
PLEASE CHECK WHETHER BACKING IS THE SAME AS WHEN SETTING Build.

[ OK ]

FIG.16D
DIALOG 4

DO YOU CONTINUE MEASUREMENT?

[ YES ]　[ NO ]

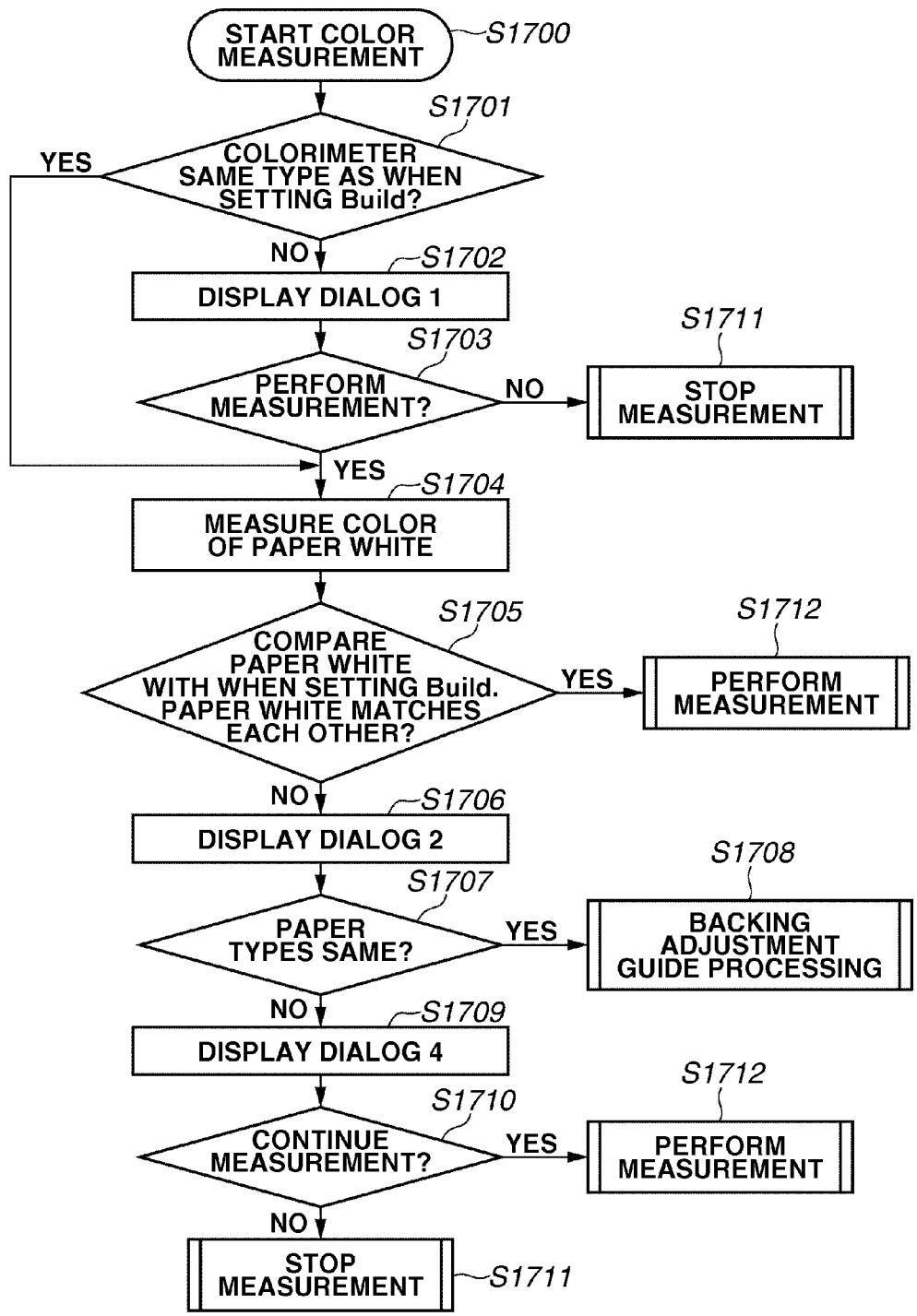

DIALOG 5

DIALOG 6

DIALOG 7

PROFILE PROCESSING APPARATUS, METHOD, AND PROGRAM PRODUCT TO ADJUSTING COLOR PRINTER PROFILE BASED ON CONDITION OF COLORIMETRIC MEASUREMENT OF TEST PATCH

BACKGROUND OF THE INVENTION

1. Field of the Invention

The present invention relates to a profile processing apparatus, a profile processing method, and a program thereof.

2. Description of the Related Art

In recent years, an image quality of color printers that use an electrophotographic technique or an inkjet technique has been improved to become equivalent to that of offset printing machines. Further, owing to the improvement in a printing speed and corresponding software to the printing workflow, the high-performance and high-end color printers can be used for the small number of printings or proof print before practical printing in an actual printing field. In such a field, naturally, a print quality, particularly of color, is highly demanded.

A printing workflow has conventionally adopted a color matching system (CMS) using an international color consortium (ICC) profile. It can be considered that there are two main purposes for using the CMS. One of them is to realize color by a printer equivalent to the color printed by a printing machine by using a profile of the printing machine as an input profile and a profile of the printer as an output profile to match the colors therebetween. Another one is, to absorb a temporal variation of the printer and an individual difference of the machine, the output profile is created every time printing is performed, and color matching is performed to stabilize the color to be output.

If the variation of the printer is extremely small, once the input and output profiles are created, output of the printer can be maintained in a state in which the input and output colors match with each other, and thus the printing workflow can smoothly proceed. However, in the actual printing field that strictly demands the color of the printer output, a minute variation of the color cannot be often accepted. Therefore, corresponding to a varied state of the printer, an operation for creating the profile occurs frequently.

To create the profile, a number (e.g., about 1,000 colors) of color patches are output by the printer, and then a great number of the color patches on output print samples are measured with a colorimeter. Afterward, based on information about measured color values, a conversion rule between a device dependent color space (e.g., cyan, magenta, yellow, and black (CMYK)) and a device independent color space (e.g., L*a*b*) needs to be regulated. Since huge numbers of data pieces of colorimetric values are needed in the color measurement, it takes much time for measuring the patches and calculating to create the profile.

Therefore, Japanese Patent Application Laid-Open No. 2006-165864 discusses an apparatus that extracts a small number of data pieces from the created profile to perform patch output and adjusts a look up table (LUT) of the profile based on colorimetric data. According to Japanese Patent Application Laid-Open No. 2006-165864, with such a configuration in which only patches corresponding to the small number of the data pieces are used, so that the time for measuring the patches and adjusting the profile can be decreased and the adjustment of the profile can be facilitated. As a result, an operation for adjusting the profile according to the state of the printer can be frequently performed.

However, only with the configuration described in Japanese Patent Application Laid-Open No. 2006-165864, an accuracy cannot be secured when the profile is adjusted.

That is because the technique discussed in Japanese Patent Application Laid-Open No. 2006-165864 takes only operations in adjustment into consideration, and a state when the profile is created cannot be grasped. Particularly, a state of a colorimetric operation cannot be recognized.

For example, if the colorimeter used to create the profile is different from the one used to adjust the profile, due to a difference between types of the colorimeters, even if the colorimeters measure the same patch, strictly same colorimetric values may not be acquired. Thus, even though adjustment is not actually needed, an unnecessary adjustment may be performed. Or, a mistake in a level of the adjustment may occur, and thus the adjustment with high accuracy cannot be performed.

SUMMARY OF THE INVENTION

The present invention is directed to a profile processing apparatus capable of bringing consistency to colorimetric conditions when creating a profile and when adjusting the profile and readily acquiring the profile with high accuracy, a profile processing method, and a program.

According to an aspect of the present invention, a method for processing a profile includes acquiring a colorimetric value by measuring a color of a patch printed by an image forming apparatus based on patch data, performing a calculation for creating a profile based on the colorimetric value, storing the profile created by the calculation in association with information about a condition of the colorimetric measurement, comparing, when the profile is adjusted, the colorimetric condition corresponding to the stored profile with a colorimetric condition used when the color of the patch is measured to adjust the profile, and notifying a user if the comparison determines that the colorimetric conditions do not coincide with each other.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 illustrates a system configuration of exemplary embodiments of the present invention.

FIG. 3 is a block diagram illustrating a flow of page description language (PDL) processing performed by a printer.

FIG. 6 illustrates a user interface used for creating a profile.

FIG. 9 illustrates an example of data of a measured patch.

FIGS. 16A to 16D illustrate user interfaces used for patch measuring processing performed by a profile adjustment control module.

FIG. 17 is a flowchart illustrating patch measuring processing performed by a profile adjustment control module according to a second exemplary embodiment.

DESCRIPTION OF THE EMBODIMENTS

Figure 2A:
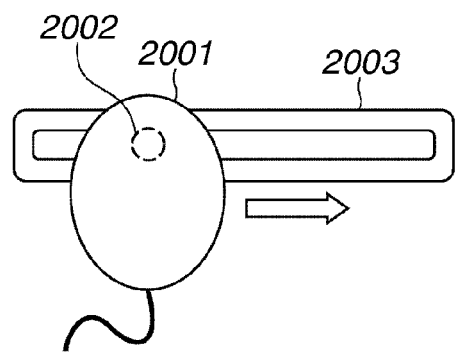
FIGS. 2A to 2D illustrate examples of colorimeters.

Various exemplary embodiments, features, and aspects of the invention will be described in detail below with reference to the drawings.

FIG. 1 illustrates an example of a configuration of a profile processing system according to a first exemplary embodiment.

According to the present exemplary embodiment, a system configuration includes two configuration elements. One of them is a host personal computer (PC) 100 that is a profile processing apparatus that creates and adjusts a profile, and a spectral colorimeter 120 is connected thereto. Another one is a multi function peripheral (MFP) 110 into which the profile is to be created. The host PC 100 and the MFP 110 are connected to a network 130. The MFP 110 performs a print operation according to a print instruction and print data received from the host PC 100 via the network 130.

The host PC 100 includes a central processing unit (CPU) 105 that executes various programs and controls each unit, a hard disk drive (HDD) 101 that is a storage apparatus for storing programs and data pieces, a read only memory (ROM) 102 that stores a program for activating the host PC 100, and a random access memory (RAM) 103 that stores the program read from the HDD 101 and the ROM 102 and temporarily stores the data when the program is executed. The host PC 100 further includes a universal serial bus (USB) interface (I/F) 104 that connects an external device to the host PC 100, a network I/F 108 that performs an interface operation with the network 130, a display 107 for displaying a state of the host PC 100, a mouse and keyboard 106 for receiving an input from a user, and an internal bus 109 for connecting units to one another. The spectral colorimeter 120 is connected to the host PC 100 via the USB I/F 104 and performs a colorimetric operation according to a predetermined command communication from the host PC 100.

The MFP 110 includes a CPU 117 that executes programs for performing operations of the MFP, an HDD 111 that stores programs and data pieces, a ROM 112 that stores a control program for activating the MFP 110, a RAM 113 that stores the program read from the HDD 111 and the ROM 112 and temporarily stores the data, and a network I/F 114. Further, the MFP 110 includes a display and touch panel 116 as an operation unit which displays a state of the MFP 110 and via which the user performs input. Furthermore, the MFP 110 includes an image processing unit 115 that converts print data received via the network I/F 114 into an image appropriate to a printer unit 118 and the printer unit 118 that prints the image that has been processed by the image processing apparatus 115 to be converted into the CMYK data. The printer unit 118 prints the received image data onto a paper medium with CMYK color materials using an electrophotographic technique or an inkjet technique.

Next, a specific example of the spectral colorimeter 120 will be described. According to the present exemplary embodiment, colorimeters of a plurality of types can be used as the spectral colorimeter 120.

FIG. 2A illustrates a colorimeter of a manual slide type. With the manual slide type colorimeter, a measuring head 2001 is slid along a measuring guide 2003 placed on an object to be measured to acquire a colorimetric value. The measuring guide 2003 includes a hollow portion having a height corresponding to a measuring hole 2002 of the measuring head 2001 and a width of a paper size approximately, and has a thickness with which the measuring guide 2003 fixedly contacts with the object to be measured when the measuring hole 2002 is fixed into the hollow portion. While the user is manually sliding the measuring instrument, the spectral colorimeter 120 measures a spectral reflectance of the object to be measured, converts the spectral reflectance into an L*a*b* colorimetric value, and transmits the measured value to the host PC 100 via the USB I/F 104. The manual slide type colorimeter illustrated in FIG. 2A can be used when patches to be measured are arranged in a continuous manner.

Figure 2B:
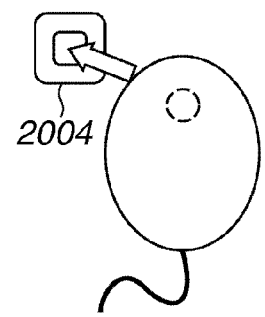

FIG. 2B illustrates a manual measuring instrument of another type. A measuring guide 2004 includes a measuring hole having an almost same size as that of the measuring hole 2002, which is used to measure one patch.

Figure 2C:
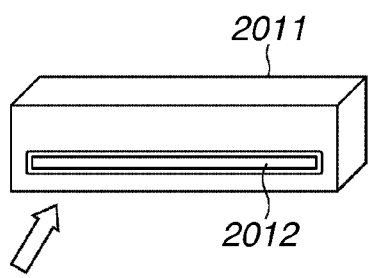

FIG. 2C illustrates a colorimeter of a sheet through type. A body of a sheet through type colorimeter 2011 includes an internal measuring head. The sheet through type colorimeter 2011 sequentially conveys in an arrow direction an object to be measured that is inserted from a measuring slit 2012 by a user in the arrow direction, measures the spectral reflectance of the object to be measured with the internal measuring head, converts the spectral reflectance into the L*a*b* colorimetric values, and transmits the colorimetric values to the host PC 100.

Figure 2D:
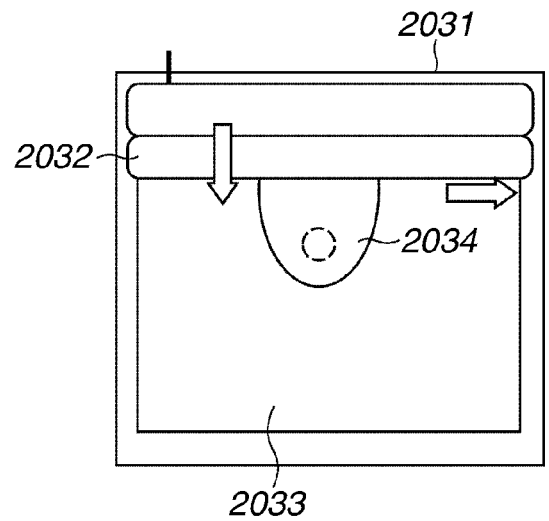

FIG. 2D illustrates a colorimeter of a table type. A body of a colorimeter 2031 includes a measuring head 2034, a measuring arm 2032, and a measuring board 2033. The measuring head 2034 is attached to the measuring arm 2032 and the measuring arm 2032 is moved under the control of the host PC 100 to measure an arbitrary position on the object to be measured that is fixed onto the measuring board 2033. The colorimeter 2031 sequentially converts the measured spectral reflectance into the L*a*b* colorimetric values, and transmits the L*a*b* colorimetric values to the host PC 100.

Next, an operation flow in which the MFP 110 receives the print data and performs the print operation will be described with reference to a block diagram illustrated in FIG. 3. The MFP will be described as an example of a configuration of an apparatus that outputs (prints) patches, however, a single function printer can be adopted, as long as it is an image forming apparatus having a print function.

The present operation flow can be realized when the CPU 117 executes a program that is stored in the HDD 111 of the MFP and read into the RAM 113.

In processing 301, the CPU 117 of the MFP 110 stores the print data received via the network I/F 114 in the RAM 113. In processing 302, a PDL interpretation unit interprets the PDL that is the stored data.

The PDL data to be interpreted has color values such as red, green, and blue (RBG) values and CMYK values for each drawing image data, and CMS processing 303 for reproducing the color values by the printer is performed. The CMS processing combines a source profile 306 indicating color information of a monitor and a printing machine used to reproduction and a destination profile 307 indicating color information of the printer so as to generate color information for the printer to reproduce the colors of the monitor and the printing machine, and then performs color matching.

According to the present exemplary embodiment, the profile created and adjusted at a side of the host PC 100 is transferred to the HDD 101 of the MFP 110, and then used as the destination profile of the CMS processing. Next, rasterization processing 304 rasterizes PDL drawing image data subjected to the CMS processing into a bitmap image according to a resolution of the printer unit. The CPU 117 transmits the rasterized bitmap data to the image processing unit 305/115. After performing the image processing appropriate for the printer unit 118, the image processing unit 305/115 transfers the image to the printer unit 118.

Figure 4:
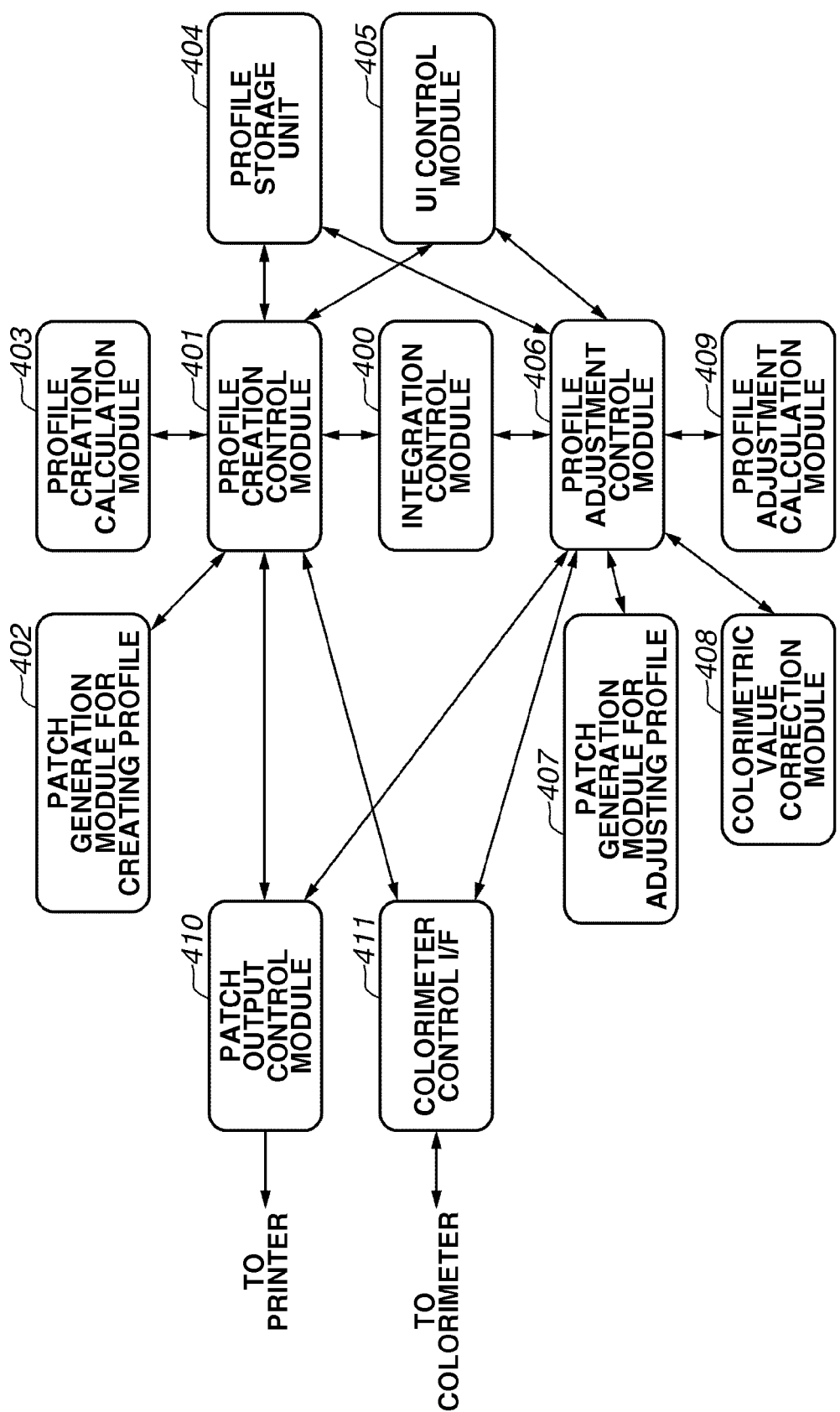
FIG. 4 illustrates a software module configuration of a profile creation apparatus.

Next, software modules of a profile processing (creating and adjusting) apparatus that are realized as programs operated by the CPU 105 of the host PC 100 will be described with reference to FIG. 4.

Figure 5:
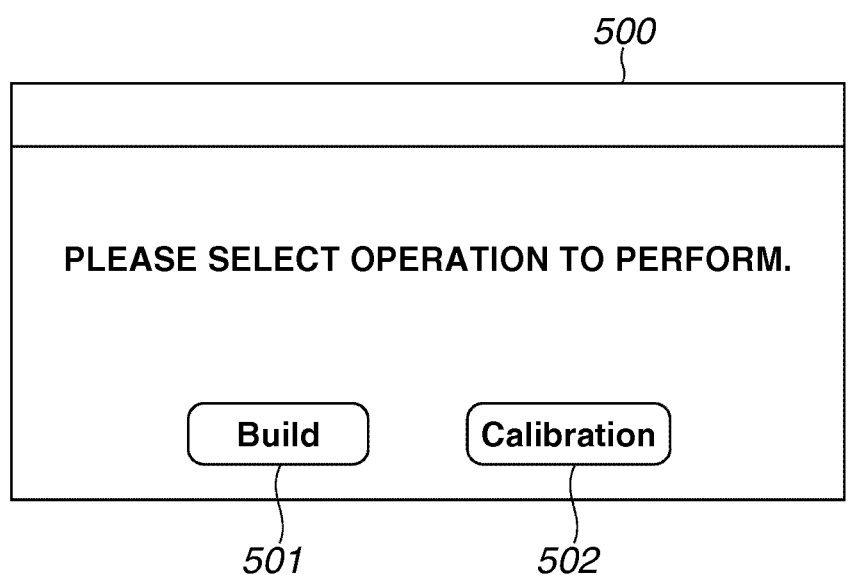
FIG. 5 illustrates a screen displayed when a profile creation apparatus is activated.

An integration control module 400 causes a user interface (UI) control module 405 to display a user interface 500 as illustrated in FIG. 5 when the program is activated. If the user presses a build button 501, a profile creation control module 401 performs following control. If the user presses a calibration button 502, a profile adjustment control module 406 performs the following control.

The UI control module 405 receives requests to display a screen and to manage input from the user from not only the integration control module 400 but also the profile creation control module 401 and the profile adjustment control module 406 and performs interface processing with the user.

The profile creation control module 401 controls each module to create the profile when the profile is created. A patch generation module 402 for creating profile generates patch data for creating the profile based on information about the colorimeter connected thereto as described below, and returns the generated patch data to the profile creation control module 401.

A patch output control module 410 receives the generated patch data from the profile creation control module 401 and outputs the data to the MFP 110 via the network 130. The patch output control module 410 transmits a print instruction not for performing the CMS processing on the patch data in a print operation performed by the MFP 110.

Upon receiving the instruction from the profile creation control module 401, a colorimeter control I/F 411 transmits the colorimetric values acquired by the spectral colorimeter 120 via the USB I/F 104 and returns to the profile creation control module 401 the colorimetric values acquired by measuring the patch output that is output from the MFP 110.

A profile creation calculation module 403 receives CMYK signal values included in the patch data, Lab values acquired by measuring the patch output, and a parameter for creating the profile, creates the profile, and then returns the created profile to the profile creation control module 401.

A profile storage unit 404 receives a patch measurement value file corresponding to the profile from the profile creation control module 401, and stores the file in the HDD 101 that is a profile information storage unit by associating with the profile. As described below, the patch measurement value file described above includes at least information about the colorimeter and colorimetric values of paper white whose colors is measured when the profile is created.

The profile adjustment control module 406 controls each module to adjust the profile that is created and stored in the profile storage unit 404 when the profile is adjusted. A patch generation module 407 for adjusting the profile generates the patch data for adjusting the profile based on the information about the colorimeter and the profile transmitted from the profile adjustment control module 406, and returns the patch data thereto. The profile adjustment control module 406, similarly to when creating the patch data, transmits the patch data generated by the patch output control module 410 and requests the MFP 110 to output the patch data. Further, the profile adjustment control module 406 controls via the colorimeter control I/F 411 measurement of the colors of the patch output that is output.

A colorimetric value correction module 408 is a module for correcting (converting) a patch measurement value when the profile is adjusted to that when the profile is created. The colorimetric operation performed by the profile adjustment control module 406 and an operation performed by the colorimetric value correction module 408 will be described in detail below. A profile adjustment calculation module 409 receives the profile, the CMYK color values of the patch for adjustment, and the colorimetric values, and then returns the adjusted profile to the profile adjustment control module 406.

FIG. 6 illustrates a build setting screen 600 that the profile creation control module 401 causes the UI control module 405 to display so that the user can input the parameter for creating the profile.

The build setting screen 600 includes a text field 601 for inputting a file name to store a created profile, a text field 602 for inputting a file name to store colorimetric data, a field 603 for specifying a printer that is a target to create a profile, a check box 604 for specifying the number of grid points in an A2B table of the profile, a check box 605 for specifying the number of grid points in a B2A table of the profile, a field 606 for specifying the maximum loaded amount of a toner or an ink according to a setting of a color separation table when the B2A table is generated, a field 607 for specifying an amount of ink, a field 608 for specifying a type of the colorimeter, and a start button 609 for starting a creation operation.

Upon receiving the specifications described above, the profile creation control module 401 controls each module. More specifically, the profile creation control module 401 instructs the profile storage unit 404 to store the profile with the file names specified by the text fields 601 and 602. Further, the profile creation control module 401 instructs the patch output control module 410 to output the patch data to an output destination printer specified by the field 603. Further, the profile creation control module 401 instructs the profile creation calculation module 403 to create the profile using the number of grid points specified by the check boxes 604 and 605, and at that time, to perform color separation with the parameters specified by the fields 606 and 607. Furthermore, the profile creation control module 401 informs the colorimeter control I/F 411 of the type of the colorimeter and instructs the colorimeter control I/F 411 to perform communication with an appropriate colorimeter.

Figure 7:
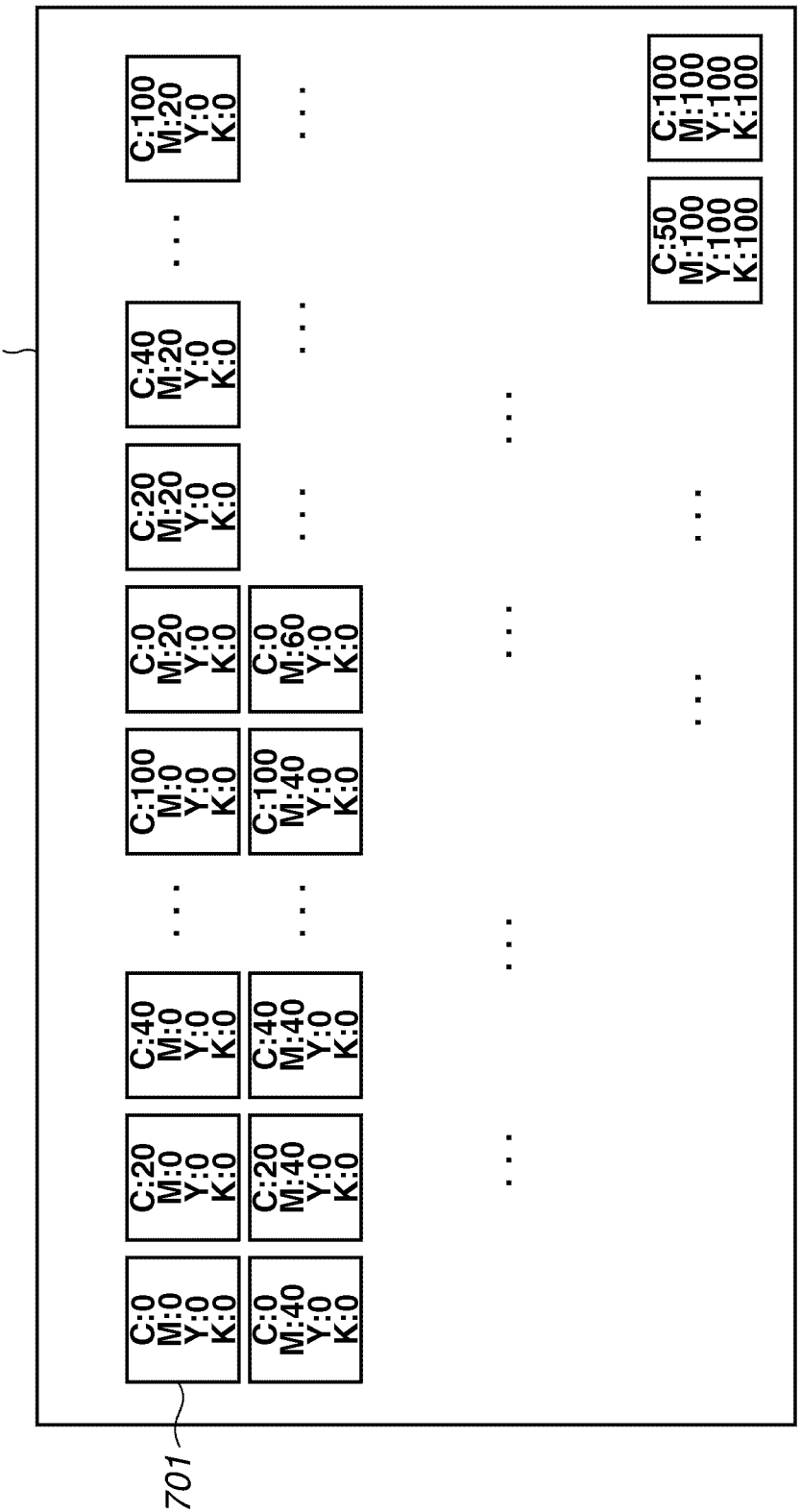
FIG. 7 illustrates patches for creating a profile.

FIG. 7 illustrates an example of the patch data generated by the patch generation module 402 for creating the profile. The patch generation module 402 for creating the profile generates a whole image frame 700 matching a paper size of the printer and arranges the patches having sizes matching the colorimeter within the whole image frame 700. Regarding the number of patches to be arranged in the present exemplary embodiment, it is assumed that in CMYK, the arranged patches of "C", "M", and "Y" have the same division numbers, which depend on density of "K" and the following combinations can be acquired.

K CMY
0 6*6*6
20 6*6*6
40 6*6*6
60 6*6*6
80 4*4*4
100 3*3*3

When the division numbers are 6*6*6, signal values for "C", "M", and "Y" are 0, 20, 40, 60, 80, and 100(%). Accordingly, the number of combinations of "C", "M", and "Y" is 216. When the division numbers are 4*4*4, the signal values for "C", "M", and "Y" are 0, 33, 66, and 100(%). Accordingly, the number of combinations of "C", "M", and "Y" is 64. When the division numbers are 3*3*3, the signal values for "C", "M", and "Y" are 0, 50, and 100(%). Accordingly, the number of combinations of "C", "M", and "Y" is 27. Thus, the total number of the patches is 216*4+64+27=955. Regarding an increment in "C", "M", and "Y", the value is incremented in the order of C, M, Y, and K, and the first patch is CMYK=(0, 0, 0, 0), in other words, that is a patch area 701 in which nothing is printed.

Figure 8:
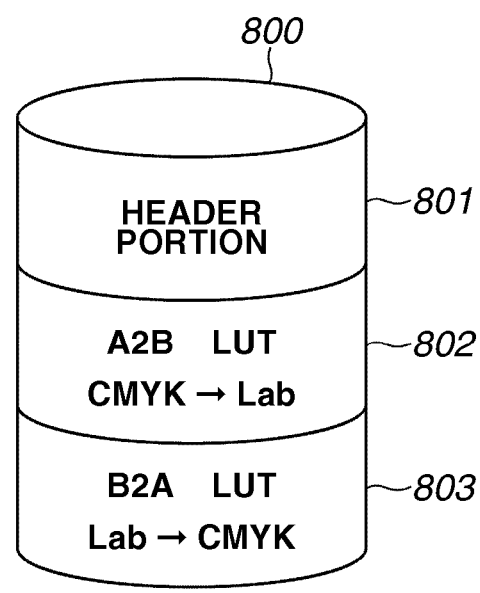
FIG. 8 illustrates a data structure of a profile.

Next, a data structure of the profile according to the present invention will be described with reference to FIG. 8. A profile 800 includes a header portion 801, an A2B lookup table (LUT) 802, and a B2A LUT 803. The header portion 801 is information including a format version of the profile, a time stamp, and a type of the device to which the profile is applied.

The A2B LUT 802 is a LUT for converting a device dependent color space into a device independent color space. According to the present exemplary embodiment, the A2B LUT 802 has a format that includes four-dimensional grid points of CMYK and stores Lab data at each grid point. The B2A LUT 803 is a LUT for converting the device independent color space into the device dependent color space. According to the present exemplary embodiment, the B2A LUT 803 has a format that includes three-dimensional grid points of Lab and stores the CMYK data at each grid point.

When the profile is created, all pieces of the information need to be generated. A target to be adjusted in the profile adjustment is the B2A LUT 803. The B2A LUT 803 expresses what CMYK values are used to print the color values in the device independent color space in order to obtain the measurable color values in the device independent color space. By adjusting the B2A LUT 803, the profile is adjusted according to a state of the device each time.

FIG. 9 illustrates an example of information about the colorimetric values which the profile creation control module 401 instructs the profile storage unit 404 to store. A colorimetric data file 900 has a format including information pieces about a colorimeter used, a target printer, a patch number, and Lab colorimetric values corresponding to the patch number.

Next, an operation flow will be described for creating the profile by acquiring information about patch signal values (CMYK signal values) and patch colorimetric values (Lab colorimetric values) from the profile creation calculation module 403 and the profile creation control module 401, with reference FIGS. 10A to 10C.

Figure 10A:
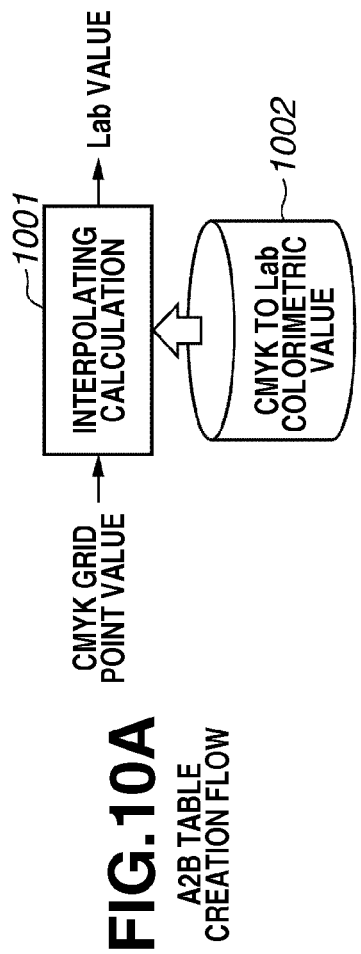
FIGS. 10A to 10C are block diagrams illustrating operation flows for creating profiles.

FIG. 10A is a block diagram illustrating an operation flow for generating the A2B LUT 802 of the profile. Interpolating calculation processing 1001 in the profile creation calculation module 403 calculates the Lab values corresponding to the values of the CMYK grid points to generate the A2B LUT 802 using the CMYK to Lab colorimetric value 1002 that is a corresponding table between the CMYK patch signal values and the colorimetric values.

The CMYK grid point values indicate the grid points of 17*17*17*17 or 9*9*9*9 set by the user. When the number of CMYK grid points is 17*17*17*17, the CMYK values are incremented by every 6.25% in the ascending order of C, M, Y, and K, from 0 to 100%. When the number of CMYK grid points is 9*9*9*9, the CMYK values are incremented by every 12.5% in the ascending order of C, M, Y, and K, from 0 to 100%.

Some CMYK patch signal values close to each of the CMYK grid point values are selected, and from the Lab values corresponding to the selected CMYK patch signal values, the Lab values corresponding to the CMYK grid point values are acquired by an interpolating calculation. Various known methods that are conventionally discussed can be used for the interpolating calculation, and the detail description thereof is omitted here.

Figure 10B:
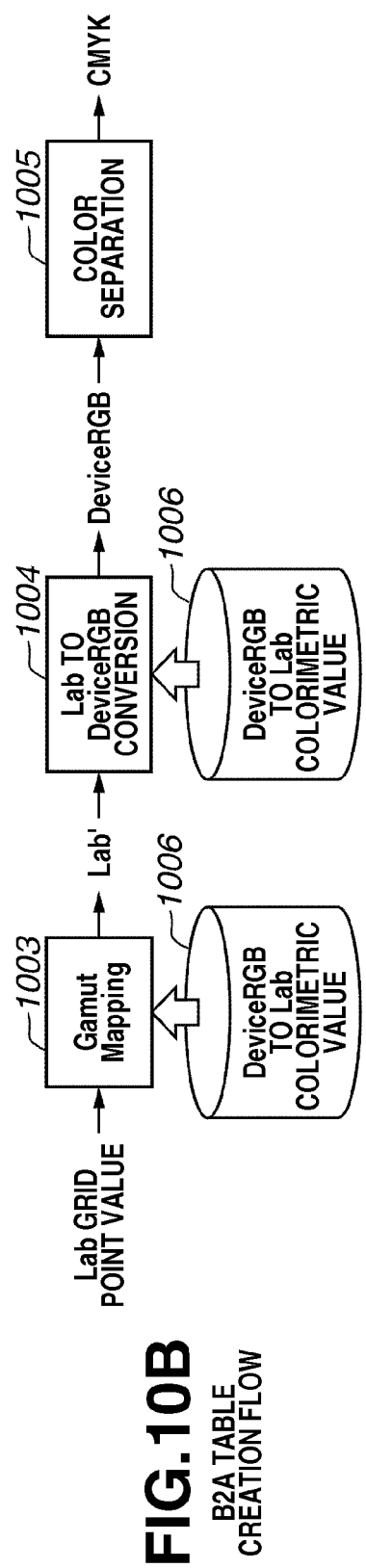

FIG. 10B is a block diagram illustrating an operation flow for generating the B2A LUT 803 of the profile. In the flow for generating the B2A table, the Lab grid point values of 17*17*17 to 33*33*33 are generated according to the number of B2A profile grid points 605 set by the user.

When the number of the grid point values are 17*17* 17, the value of "L" is incremented by every 6.25 from 0 to 100, and the values of "a" and "b" are incremented by every 16 from −128 to 128. The values are generated in the ascending order of "b", "a", and "L". When the number of the grid points are 33*33*33, the value of "L" is incremented by every 3.125 from 0 to 100, and the values of "a" and "b" are incremented by every 8 from −128 to 128. The values are generated in the ascending order of "b", "a", and "L".

Gamut mapping 1003 performs color space compression on the grid-point-generated Lab grid points using information included in a DeviceRGB to Lab colorimetric value corresponding table 1006. Since the Lab values of the Lab grid point values spread wider than a color reproduction region of the printer, the color space compression is necessary. At this point, the DeviceRGB to Lab colorimetric value corresponding table 1006 that is a three-dimensional LUT including the DeviceRGB values as the input and the Lab values as the output is information for determining an area that the printer can reproduce. The DeviceRGB to Lab colorimetric value corresponding table 1006 is generated using the CMYK to Lab colorimetric values 1002 and color separation processing 1005, and the flow for generating the DeviceRGB to Lab colorimetric value corresponding table 1006 will be described below with reference to FIG. 10C.

Lab to DeviceRGB conversion 1004 reversely converts the Lab values which are subjected to the color space compression by the gamut mapping 1003 into the DeviceRGB values using the DeviceRGB to Lab colorimetric value corresponding table 1006. This calculation can be performed by various known methods, and any of them may be used. The detail description thereof is omitted here.

The color separation processing 1005 finally converts the DeviceRGB values into the CMYK values, calculates the CMYK values corresponding to the Lab grid point values, and then completes the B2A LUT 803. Based on the information about the maximum loaded amount of the toner or ink in the field 606 and the amount of ink in the field 607, the color separation processing 1005 from the DeviceRGB values to the CMYK values is performed.

Figure 10C:
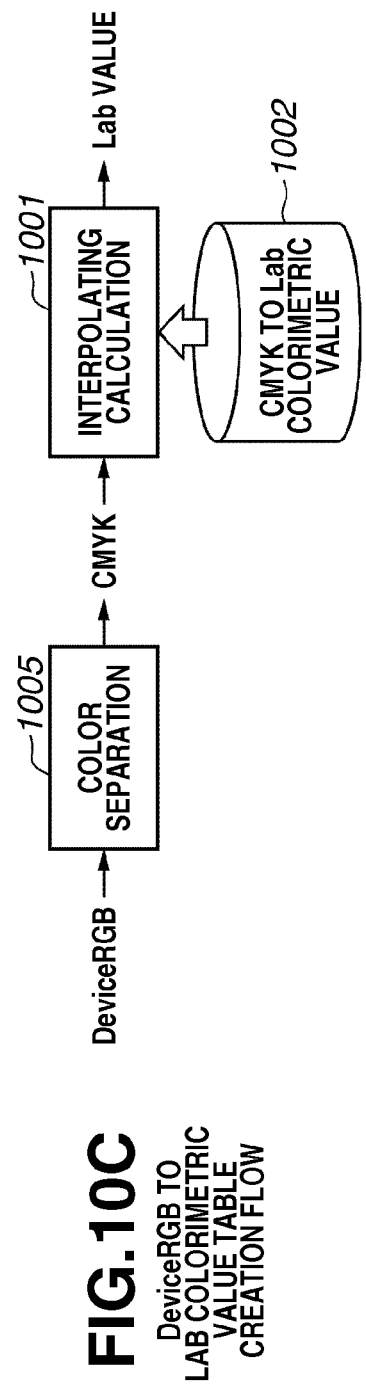

FIG. 10C is a block diagram illustrating an operation flow for acquiring the DeviceRGB to Lab colorimetric value corresponding table 1006.

In the flow for generating the DeviceRGB to Lab colorimetric value corresponding table 1006, firstly, the DeviceRGB grid values are generated. Here, it is assumed that the RGB values including the number of grid points of 33*33*33 are generated and incremented by every 8 from 0 to 255 in the ascending order of B, G, and R. The DeviceRGB values generated as described above are converted into the CMYK values by the color separation processing 1005. At this point, the parameter of the color separation processing 1005 uses the same parameter as that used in the flow for generating the B2A table.

Subsequently, the interpolating calculation processing 1001 same as that used in the flow for generating the A2B table is performed to acquire the Lab values.

As described above, the profile creation control module 401 creates the profile, stores the profile and the colorimetric value information in the profile storage unit 404, and then completes the processing for creating the profile.

Next, processing performed by the profile adjustment control module 406 will be described with reference to drawings.

Figure 11:
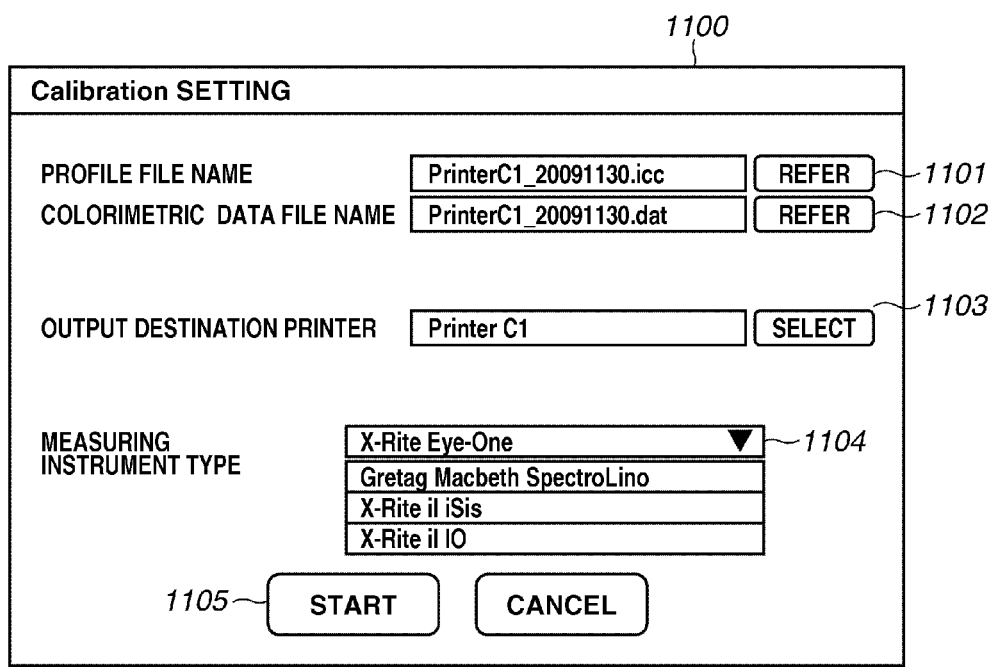
FIG. 11 illustrates a user interface used for adjusting a profile.

FIG. 11 illustrates an example of a displayed screen which the profile adjustment control module 406 causes the UI control module 405 to display to acquire an input from the user when starting the profile adjustment processing.

A calibration setting screen 1100 includes a field 1101 for specifying a file name of a profile to be adjusted, a field 1102 for specifying a file name of a colorimetric data file at the time of profile creation, a field 1103 for specifying a printer to be a target, and a drop-down list 1104 for specifying a type of a colorimeter.

When the user inputs the information described above and presses a start button 1105, the profile adjustment control module 406 receives the information input by the user from the UI control module 405 and controls the following processing.

The profile adjustment control module 406 transmits the file name of the profile and the information about the colorimeter to the patch generation module 407 for adjusting the profile and requests the patch generation module 407 for adjusting the profile to generate the patch for adjusting the profile. The information about the colorimeter includes a product name of the colorimeter and an apparatus body identification number thereof. The profile adjustment control module 406, similarly to when the profile is created, transmits the patch data generated by the patch generation module 407 for adjusting the profile to the patch output control module 410 and controls the target printer to output the patch. When the patch is output from the printer and the user is prepared for measuring the colors of the patch, the colorimeter is operated via the colorimeter control I/F 411 to acquire the colorimetric values. The signal values and the colorimetric values of the patch acquired as described above are transmitted to the profile adjustment calculation module 409 to control the adjustment of the B2A LUT 803 of the profile.

Operations of the patch generation module 407 for adjusting the profile and the profile adjustment calculation module 409 will be described below with reference to drawings.

Figure 12:
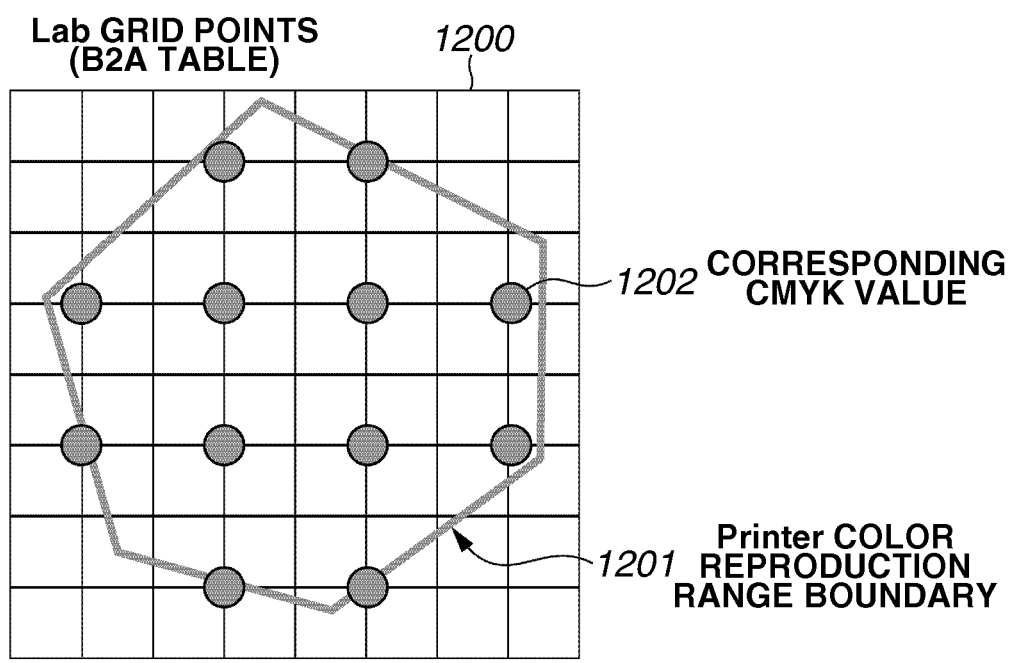
FIG. 12 schematically illustrates extraction of patch data for adjusting a profile.

FIG. 12 is a schematic diagram illustrating that the patch generation module 407 for adjusting the profile extracts the CMYK data for adjusting the profile from the B2A LUT of the profile, the name of which is specified in the field 1101. For the sake of simplifying the description, FIG. 12 is two-dimensionally illustrated with the decreased number of the grid points, however, Lab grid points (B2A table) 1200 include the grid points same as those in the B2A table of the profile created by the profile creation control module.

From among the grid points (Lab values) inside of or close to a printer color reproduction region boundary 1201 that is a color reproduction boundary of the printer unit 118 of the Lab grid point values in the B2A table, the grid point values are extracted as samples so that about 100 patches can be acquired as a result, and then pieces of CMYK value data 1202 corresponding to the extracted grid point values are extracted.

Figure 13:
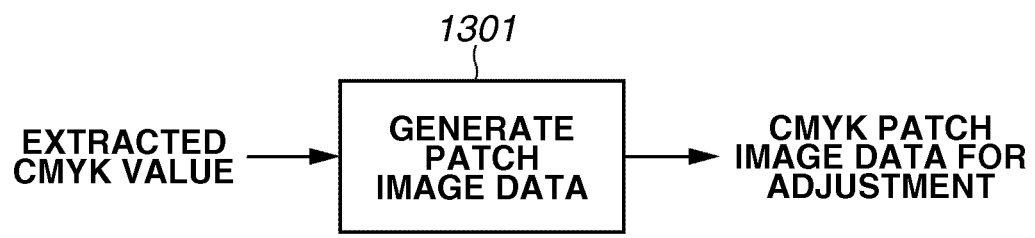
FIG. 13 is a block diagram illustrating a flow for converting patch data into image data.

Next, in patch image data generation processing 1301 illustrated in FIG. 13, the extracted CMYK data sis appropriately re-arranged and changed into the image data as the patch appropriate for a paper size matching the printer unit 118 and a type of the colorimeter. At this point, in addition to the patch of the CMYK data corresponding to the sampled Lab grid point values, the patch with which paper white having zero for all of the CMYK values can be measured is included in the image data. This data is used as the patch for adjusting the Lab grid point values.

After such processing described above, the patch generation module 407 for adjusting the profile returns the image data including the patch signal values to the profile adjustment control module 406.

Figure 14:
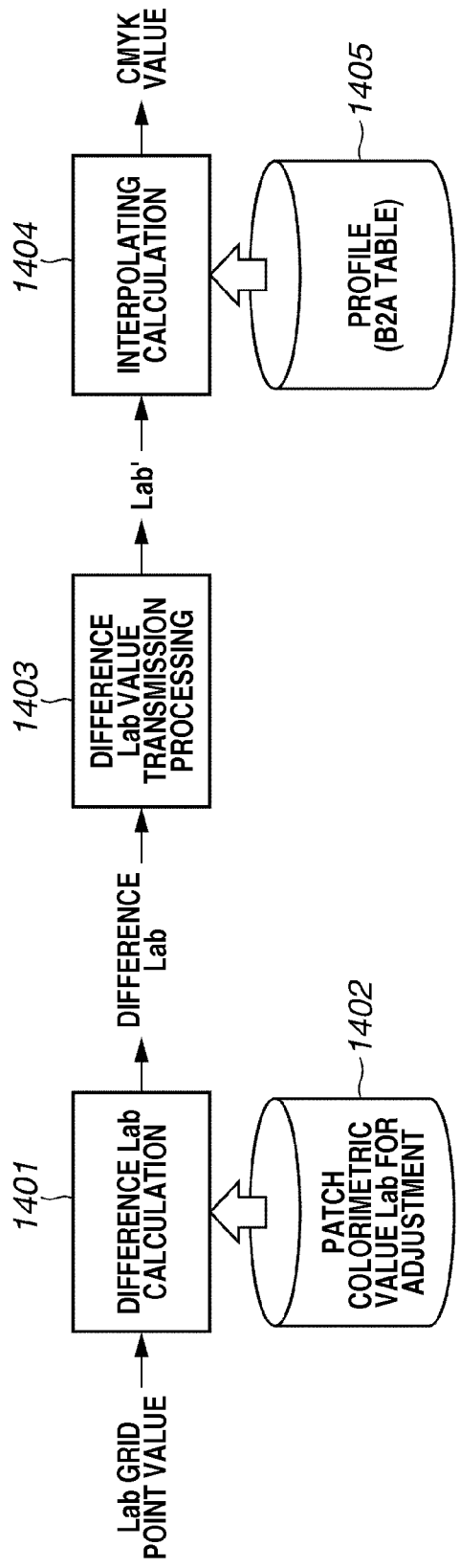
FIG. 14 is a block diagram illustrating a flow of profile adjustment calculation processing.

Next, calculation processing for adjusting the profile performed by the profile adjustment calculation module 409 upon receiving an instruction from the profile adjustment control module 406 will be described with reference to FIG. 14.

In difference Lab calculation processing 1401, the profile adjustment calculation module 409 calculates a difference between the Lab grid point values sampled from the B2A LUT 803 by the patch generation module 407 for adjusting the profile and an adjustment patch colorimetric value Lab 1402 that is the data acquired by printing the patch for adjusting the Lab grid values on the above-described paper and measuring with the colorimeter the colors of the printed patch for adjusting the Lab grid point values.

Since the CMYK values for reproducing the Lab having the grid points values as the patch for adjusting the Lab grid point values have been output, if a state (reproduction capacity) of the printer unit 118 does not change, the difference will be zero for each grid point. However, if the printer unit 118 changes with time, or due to the effect of temperature or humidity, the difference of the Lab grid point values is acquired.

Next, in difference Lab value transmission processing 1403, the Lab difference value corresponding to each sampled Lab grid point value is transferred to each grid point in the B2A LUT 803. By this processing, the acquired difference value is reflected to each grid point close to each sampled Lab grid point value by weighing according to a distance from the sampled Lab grid point. As a result of the reflection, at each grid point close to the Lab grid point, the influence of the difference value smoothly changes according to the distance. Accordingly, each grid point in the B2A LUT changes its Lab value by as much as the printer changes.

In interpolating calculation processing 1404, the CMYK values corresponding to the moved Lab values are acquired by the interpolating calculation using a group of CMYK values corresponding to a group of the Lab values at the grid points close to the moved Lab values in a B2A table 1405 of the original profile. Finally, the acquired CMYK values are added to the CMYK values corresponding to the Lab values at each grid point in the B2A LUT. Accordingly, a Lab to CMYK conversion table, that is the B2A LUT of the profile, foe the changed printer can be acquired.

The profile adjustment calculation module 409 returns the B2A LUT of the profile adjusted as described above to the profile adjustment control module 406, and then completes the processing.

Figure 15:
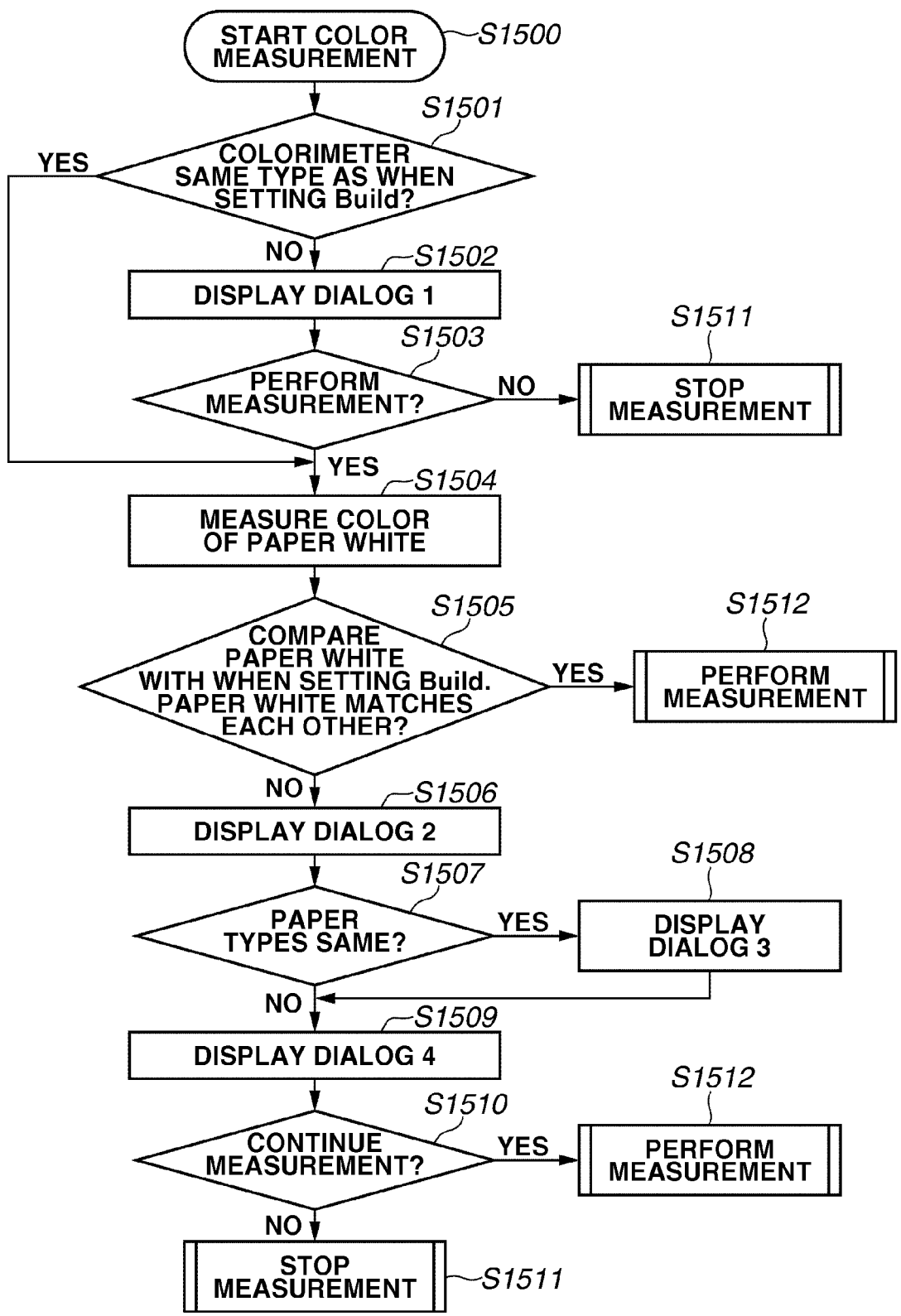
FIG. 15 is a flowchart illustrating patch measuring processing performed by a profile adjustment control module according to a first exemplary embodiment.

FIG. 15 is a flow chart illustrating check processing performed on the colorimeter by the profile adjustment control module 406 when the colors of the adjustment patch are measured. Each of dialogs, which are described below, for displaying a check result is configured to notify the user of the information.

In step S1500, after the profile adjustment control module 406 outputs the adjustment patch to the MFP 110, the user sets paper on which the patch is printed by the printer unit 118 of the MFP 110 according to the adjustment patch for the colorimeter and instructs a colorimetric operation, and then the processing is started.

In step S1501, the profile adjustment control module 406 compares information about the colorimeter when the profile is created that is acquired from the colorimetric value data file 900 stored in the profile storage unit 404 with information about the currently connected colorimeter that is acquired from the colorimeter control I/F 411. As a result of the comparison, if the types of the colorimeters are the same (YES in step S1501), the processing proceeds to step S1504. If the types of the colorimeters are different (NO in step S1501), then in step S1502, the profile adjustment control module 406 instructs the UI control module 405 to display a dialog 1 illustrated in FIG. 16A.

In step S1503, the profile adjustment control module 406 determines confirm a user input for determining whether to perform the measurement or not. When the profile adjustment control module 406 receives an input for stopping the measurement (NO in step S1503), in step S1511, processing for stopping the measurement is performed. When the profile adjustment control module 406 receives an input for performing the measurement (YES in step S1503), the processing proceeds to step S1504. After the measurement stop processing is performed in step S1511, the user may change the spectral colorimeter 120 connected to the host PC 100 to the spectral colorimeter 120 that is the same as that used when the profile is created. In this case, the processing is performed again from step S1501.

Next, in step S1504, the profile adjustment control module 406 measures the colors of the patch corresponding to the paper white via the colorimeter control I/F 411. The profile adjustment control module 406 receives the colorimetric values of the paper white from the colorimeter control I/F 411, and, in step S1505, compares the received values with the colorimetric values of the paper white included in the colorimetric value data file 900 when the profile is created.

As a result of the comparison, if the difference between the colorimetric values of the paper white is within a threshold value, it is determined as the two types of paper white coincide with each other, in other words, the types of paper to be used coincide with each other (YES in step S1505). Then, in step S1512, the profile adjustment control module 406 instructs the colorimeter control I/F 411 to perform the subsequent measurement on the patch. If it is determined that the two types of paper white do not coincide with each other (NO in step S1505), in step S1506, the UI control module 405 is instructed to display a dialog 2 to prompt the user to input an instruction.

When the user input that the types of the paper are the same in the dialog 2, then in step S1507, the profile adjustment control module 406 instructs the UI control module 405 to display a dialog 3 illustrated in FIG. 16C to further prompt the user to check.

Here, the backing refers to a base of the measuring board. For example, the measuring board 2033 of the table type colorimeter 2031 is coated with black, and when the profile is created, the paper same as the paper on which the patch is printed is placed beneath the paper on which the patch is printed on the measuring board 2033 and then measured. On the other hand, if a condition with the measuring board is changed when the profile is adjusted, and only the paper on which the patch is printed is measured without placing anything therebeneath, acquired colorimetric values are affected by the backing. Further, even if the same colorimeter is used, if the color of the measuring boards is different, since the color on the black measuring board is transmissive through the patch to be measured, the acquired colorimetric values are affected. It can be considered that the colorimetric values of the paper white are most affected. When the user inputs to have confirmed the backing, the profile adjustment control module 406 advances the processing to step S1509.

When the user inputs that the types of the paper is not the same (NO in step S1507), the profile adjustment control module 406 also advances the processing to step S1509. In step S1509, the UI control module 405 is instructed to display a dialog 4 illustrated in FIG. 16D to prompt the user to determine whether to continue the measurement.

If the profile adjustment control module 406 determines that the user inputs to continue the measurement (YES in step S1510), then in step S1512, the profile adjustment control module 406 instructs the colorimeter control I/F 411 to continue the processing for measuring the adjustment patch. Whereas if the user inputs to stop the measurement (NO in step S1510), in step S1511, the profile adjustment control module 406 instructs the colorimeter control I/F 411 to stop the measurement, and then the processing ends.

According to the configuration described above, colorimetric conditions for measuring the colors of the patch when the profile is created are compared with those when the profile is adjusted. When the colorimetric conditions are different from each other, the color measurement can be performed after checking whether to continue the color measurement with the user.

According to the configuration described above, the colorimetric conditions (colorimeter, type of paper on which the patch acquired by the paper white is printed, and backing) of when the profile is created and when the profile is adjusted can be consistent, so that the accurate profile can be readily acquired.

A system configuration of a second exemplary embodiment is the same as that of the first exemplary embodiment illustrated in FIG. 1.

According to the second exemplary embodiment, when the colorimetric values when the profile is created do not coincide with those when the profile is adjusted, and still the user inputs that the types of the paper are the same, it is assumed that the difference is caused by the condition of the backing, and then the processing for guiding the user to adjust the backing is performed.

FIG. 17 is a flowchart illustrating check processing performed on the colorimeter by the profile adjustment control module 406 when the colors of the adjustment patch are measured according to the second exemplary embodiment. Since the processing in steps S1500 to S1512 illustrated in FIG. 15 are the same as that in steps S1700 to S1712 except for the processing in step S1708, the processing other than that in step S1708 is not described and the processing in step S1708 will be described using another flow chart in FIG. 18.

In step S1707, if the user inputs that the types of the paper are the same (YES in step S1707) (and when it is determined that the paper white is different in step S1705), then in step S1708, the profile adjustment control module 406 starts processing for guiding the backing adjustment.

Figure 18:
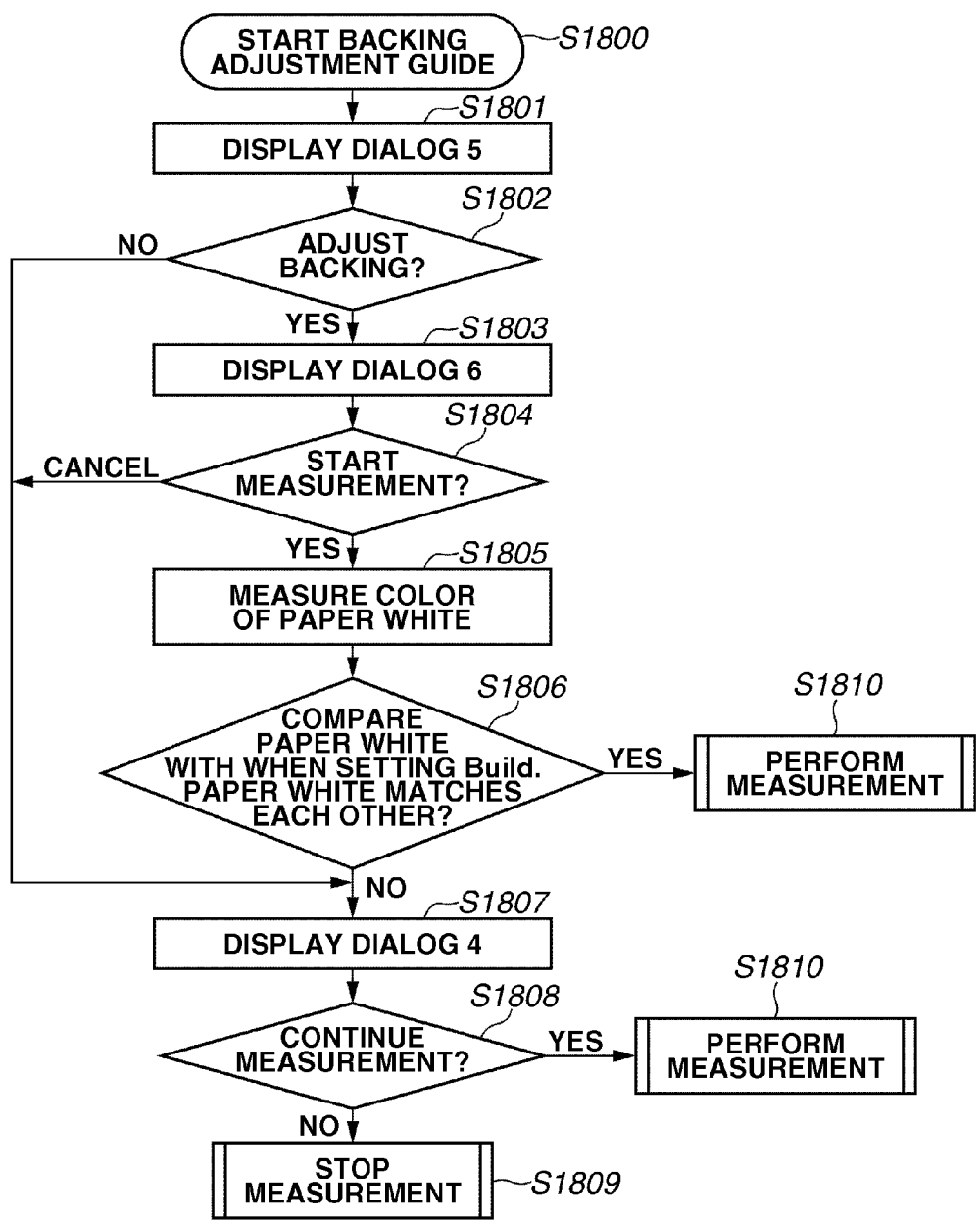
FIG. 18 is a flowchart illustrating an operation performed by a backing adjustment guide.

FIG. 18 is a flow chart illustrating processing for guiding the backing adjustment performed by the profile adjustment control module 406.

Figure 19A:
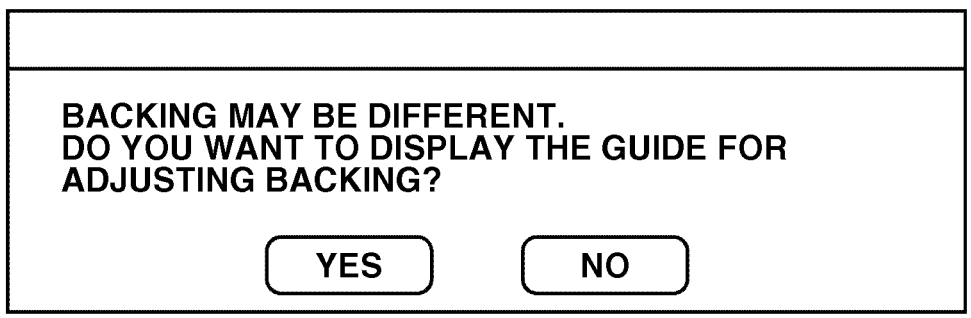
FIGS. 19A and 19B illustrate user interfaces used for backing adjustment guide processing.

In step S1800, the profile adjustment control module 406 starts the processing for guiding the backing adjustment. In step S1801, the profile adjustment control module 406 instructs the UI control module 405 to display a dialog 5 illustrated in FIG. 19A.

In step S1802, the profile adjustment control module 406 determines the user's input for the dialog 5. When the profile adjustment control module 406 determines that a backing adjustment guide is not to be displayed (NO in step S1802), the profile adjustment control module 406 advances the processing to step S1807. Whereas if the backing adjustment guide is to be displayed (YES in step S1802), the profile adjustment control module 406 advances the processing to step S1803.

Figure 19B:
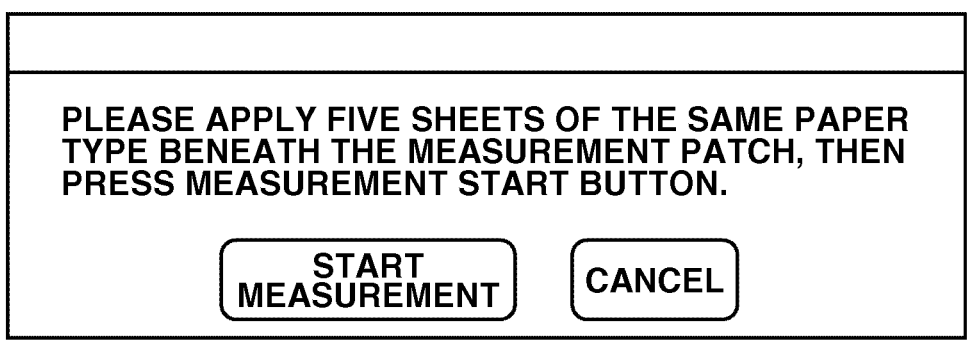

In step S1803, the profile adjustment control module 406 causes the UI control module 405 to display a dialog 6 illustrated in FIG. 19B and prompts the user to perform a backing adjustment operation using the paper of the same type as that on which a colorimetric patch is printed. In step S1804, when the user inputs to cancel the measurement, the profile adjustment control module 406 determines that the user cancels the backing adjustment operation (CANCEL in step S1804) and advances the processing to step S1807.

When the user performs the backing adjustment operation and starts the measurement (YES in step S1804), then in step S1805, the profile adjustment control module 406 instructs the colorimeter control I/F 411 to measure the paper white. The profile adjustment control module 406 receives the colorimetric values of the paper white and, in step S1806, compares the received colorimetric values with those of the paper white when the profile is created.

When the colorimetric values of the paper white match each other (YES in step S1806), in step S1810, the profile adjustment control module 406 instructs the colorimeter control I/F 411 to perform the subsequent measurement, and then the processing ends. When the colorimetric values of the paper white do not match each other (NO in step S1806), in step S1807, the profile adjustment control module 406 causes the UI control module 405 to display the dialog 4 illustrated in FIG. 16D.

In step S1808, the profile adjustment control module 406 determines the user's input for the dialog 4. If the profile adjustment control module 406 determines that the user inputs to continue the measurement (YES in step S1808), then in step S1810, the profile adjustment control module 406 instructs the colorimeter control I/F 411 to perform the subsequent measurement. If the user inputs to stop the measurement (NO in step S1808), then in step S1809, the profile adjustment control module 406 instructs the colorimeter control I/F 411 to stop the measurement.

By performing the processing as described above, a simple guiding can absorb the difference between the colorimetric values caused by the difference of the colors (backing condition) of the measuring board when the profile is created and when the profile is adjusted, and profile adjustment can be performed accurately.

A system configuration of a third exemplary embodiment is the same as that of the first exemplary embodiment as illustrated in FIG. 1.

The third exemplary embodiment will describe an example for correcting a difference between the types of the colorimeters used when the profile is created and when the profile is adjusted.

The profile adjustment control module 406 provides a configuration in which, after the colorimetric operation is performed on the adjustment patch, the colorimetric value correction module 408 performs correction of colorimetric value difference caused by difference of the types of the colorimeters. Further, the profile adjustment control module 406 provides a configuration, when the colorimeter of the different type is used, for enabling the user to select whether to perform the correction of the colorimetric values.

Figure 20:
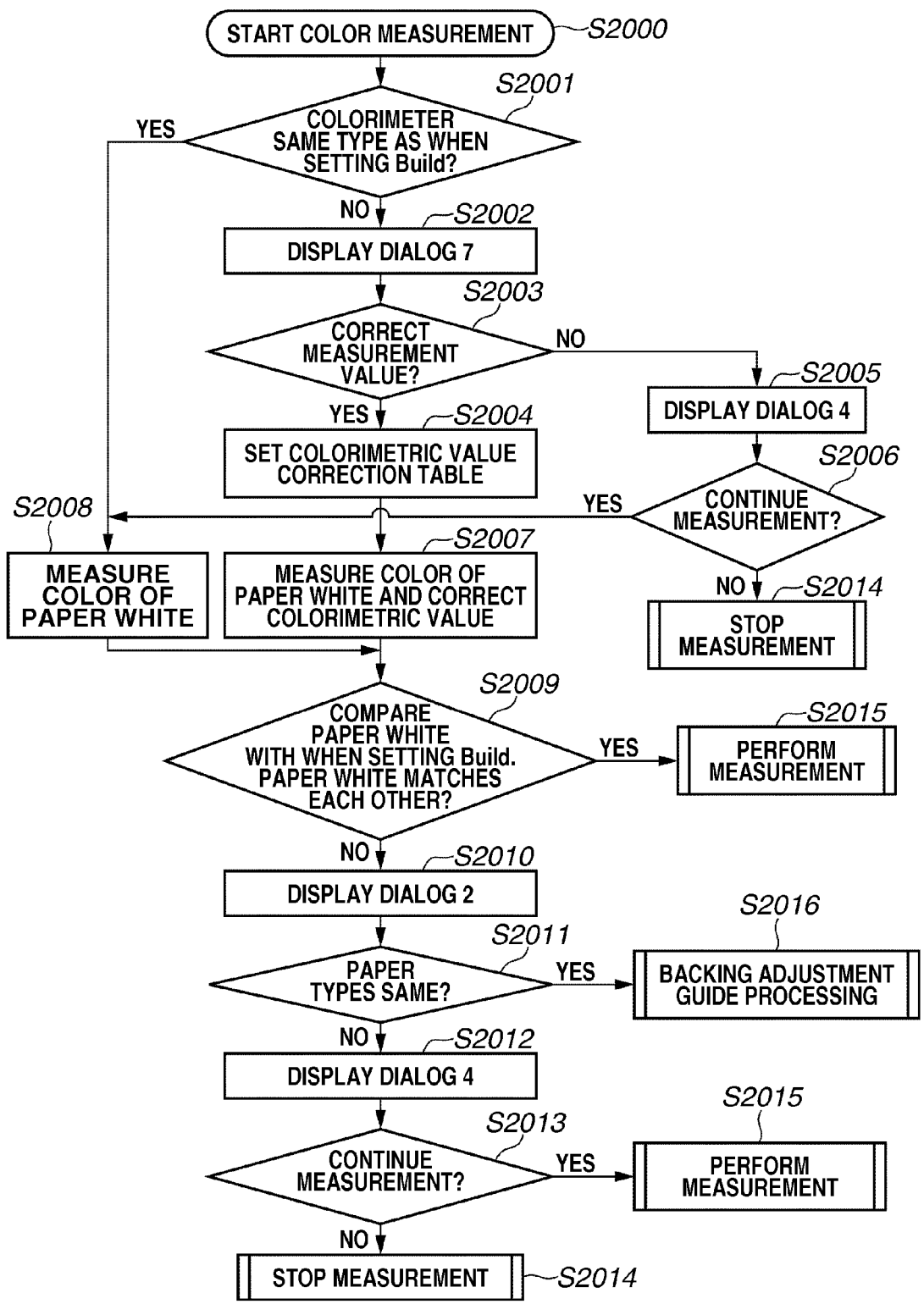
FIG. 20 is a flowchart illustrating patch measuring processing performed by a profile adjustment control module according to a third exemplary embodiment.

FIG. 20 is a flow chart illustrating processing in which the profile adjustment control module 406 measures the colors of the patch for adjusting the profile. In the processing flow according to the present exemplary embodiment, since the processing subsequent to step S2009 for comparing the paper white when the profile is created with that when the profile is adjusted is the same as that subsequent to step S1605 according to the second exemplary embodiment, the description thereof will not be repeated. The processing flow from step S2000 to step S2008 will be described.

The profile adjustment control module 406 starts the colorimetric operation in step S2000.

In step S2001, the profile adjustment control module 406 determines whether the colorimeter used when the profile is created is the same as that used when the profile is adjusted. If the When colorimeter is the same (YES in step S2001), in step S2008, the paper white of the adjustment patch is measured and the processing proceeds to step S2009 for comparison processing of the paper white. The processing subsequent to step S2009 is performed in the similar manner to that subsequent to step S1705 in the first exemplary embodiment where the colorimetric value correction is not performed.

Figure 21:
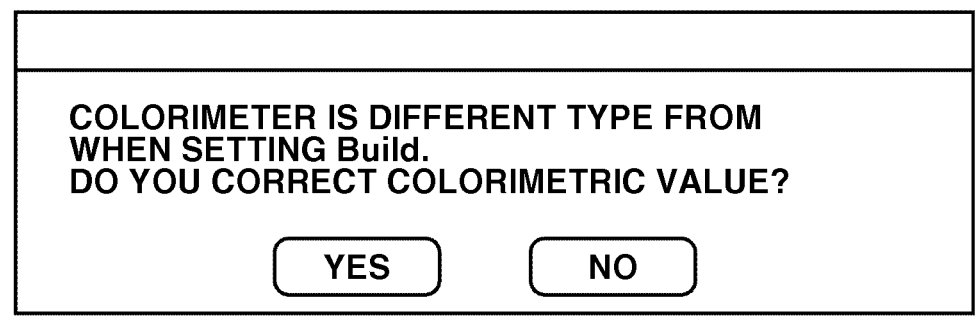
FIG. 21 illustrates a user interface for patch measuring processing according to the third exemplary embodiment.

In step S2001, similarly to step S1501, when it is determined that the colorimeter is not the same as when the profile is created (NO in step S2001), then in step S2002, the profile adjustment control module 406 causes the UI control module 405 to display a dialog 7 illustrated in FIG. 21.

In step S2003, the profile adjustment control module 406 checks whether the user inputs to correct the colorimetric values. When the user inputs not to correct the colorimetric values (NO in step S2003), in step S2005, the profile adjustment control module 406 causes the UI control module 405 to display the dialog 4 illustrated in FIG. 16D. In step S2006, the profile adjustment control module 406 checks whether the user's input to continue the measurement.

When the user inputs to continue the measurement (YES in step S2006), the profile adjustment control module 406 advances the processing to step S2008 to measure the paper white. When the user inputs not to continue the measurement (NO in step S2006), in step S2014, the profile adjustment control module 406 instructs the colorimeter control I/F 411 to stop the measurement, and then the processing ends.

In step S2003, when the user inputs to correct the colorimetric values (YES in step S2003), in step S2004, the profile adjustment control module 406 instructs the colorimetric value correction module 408 to set the colorimetric value correction table and to perform the correction of the colorimetric values in the subsequent measurement. Next, in step S2007, the profile adjustment control module 406 instructs the colorimeter control I/F 411 to measure the paper white and controls the colorimetric value correction module 408 to perform the colorimetric value correction on the acquired colorimetric values.

Subsequently, based on the corrected colorimetric values of the paper white, in step S2009, the comparison processing is performed on the white paper and the subsequent operations are performed in the similar manner to that of the processing flow in the second exemplary embodiment. The profile adjustment control module 406 transmits to the colorimetric value correction module 408 the colorimetric values acquired after the measurement is performed in step S2015 and instructs the colorimetric value correction module 408 to perform the correction, and then performs the calculation processing for adjusting the profile using the corrected colorimetric values.

The colorimetric value correction module 408 performs the correction from a colorimeter A to a colorimeter B using the calculation of the three-dimensional LUT. The colorimetric value correction module 408 performs measurement using a plurality of colorimeters with another application on the host PC 100 in advance to form the three-dimensional LUT for Lab to Lab, and stores the three-dimensional LUT in the HDD 101. When the colorimetric value correction is performed, the profile adjustment control module 406 reads the corresponding colorimetric value correction table from the HDD 101 based on information about the colorimeter used when the profile is created, and that currently connected to the host PC 100 and gives the colorimetric value correction table to the colorimetric value correction module 408.

A method for forming the colorimetric value correction table will be described. The same CMYK patch is measured with the colorimeter A and the colorimeter B, and a reverse conversion for converting Lab into CMYK of the colorimeter A is performed based on corresponding relationships of CMYK to Lab of both colorimeters A and B. If the reverse-converted value is combined with the corresponding relationship of CMYK to Lab of the colorimeter B, the corresponding relationship of the Lab of the colorimeter A to the Lab of the colorimeter B can be acquired.

The reverse conversion can be acquired by various known calculations, and thus any method thereof can be applied to the present exemplary embodiment.

As described above, according to the configuration of the third exemplary embodiment, even when the types of the colorimeter are different, the profile can be adjusted by performing the correction of the colorimetric values.

According to the configuration described above, when the profile is adjusted, if the colorimetric conditions are different from when the profile is created, the difference can be notified, and thus the profile can be accurately adjusted.

Through the exemplary embodiments, it is described that each module of the profile creation apparatus operates as software on the host PC. Further, if a USB I/F is added to the MFP and the USB I/F colorimeter is connected thereto, each module can be configured as a software module that can be realized by the CPU, RAM, HDD, or ROM at the MFP side.

Further, if a scanner of the MFP or an external scanner reads the patch, and the read RGB values of the patch are converted into the L*a*b colorimetric values, the scanner can be used as the measuring instrument. In this case, information about the scanner used when the profile is created and when the profile is adjusted is stored, an operation flow described each exemplary embodiment can be applied to a usage of the scanner. Further, if a density meter or a digital camera is used as the measuring instrument for the patch instead of the colorimeter, the processing of the above-described exemplary embodiments can be realized.

The present invention can be realized by performing the processing described below. More specifically, software (a program) for realizing the functions of the above exemplary embodiments is supplied to a system or an apparatus via a network or various storage media and a computer (or CPU or micro processing unit (MPU)) of the system or the apparatus reads and executes the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-127070 filed Jun. 2, 2010, which is hereby incorporated by reference herein in its entirety.

What is claimed is:

1. A method for processing a profile comprising:

acquiring a colorimetric value by measuring a color of a patch printed by an image forming apparatus based on patch data;

performing a calculation for creating a profile based on the colorimetric value;

storing the profile created by the calculation in association with information about a condition of the colorimetric measurement;

comparing, when the profile is adjusted, the colorimetric condition corresponding to the stored profile with a colorimetric condition used when the color of the patch is measured to adjust the profile; and notifying a user if the comparison determines that the colorimetric conditions do not coincide with each other, wherein the colorimetric condition includes information about a colorimeter used for measuring colors.

2. The method according to claim 1, wherein the colorimetric condition additionally includes information about paper whiteness, which color is measured from the paper on which the patch is printed.

3. The method according to claim 1, wherein the notifying includes notifying that a colorimeter or a type of paper on which the patch is formed is different between when the profile is created and when the profile is adjusted, or a request to check a backing.

4. A profile processing apparatus comprising:

a calculation unit configured to create a profile based on a colorimetric value acquired by measuring a color of a patch printed by an image forming apparatus based on patch data;

a profile information storage unit configured to store the profile created by the calculation unit in association with information about a condition of the colorimetric measurement;

a comparison unit configured to compare, when the profile is adjusted, the colorimetric condition corresponding to the stored profile in the profile information storage unit with a colorimetric condition when the color of the patch is measured to adjust the profile; and a notification unit configured to notify a user if the comparison unit determines that the colorimetric conditions do not coincide with each other, wherein the colorimetric condition includes information about a colorimeter used for measuring colors.

5. The profile processing apparatus according to claim 4, wherein the colorimetric condition additionally includes Information about paper whiteness, which color is measured from the paper on which the patch is printed.

6. The profile processing apparatus according to claim 4, wherein the notification unit is configured to notify the user that a colorimeter or a type of paper on which the patch is formed is different between when the profile is created and when the profile is adjusted, or to request that a backing is checked.

7. A non-transitory computer-readable storage medium storing a program, the program comprising code portions for:
   acquiring a colorimetric value corresponding to measurement of a color of a patch printed by an image forming apparatus based on patch data;
   performing calculation for creating a profile based on the colorimetric value;
   storing the profile created by the calculation in association with information about a condition of the colorimetric measurement;
   comparing, when the profile is adjusted, the colorimetric condition corresponding to the stored profile with a colorimetric condition used when the color of the patch is measured to adjust the profile; and
   notifying a user if the comparison determines that the colorimetric conditions do not coincide with each other, wherein the colorimetric condition includes information about a colorimeter used for measuring colors.

* * * * *